United States Patent Office 3,488,308
Patented Jan. 6, 1970

3,488,308
AEROSOL METALLIC COATING FORMULATIONS
WITH IMPROVED RESISTANCE TO DELEAFING
Aaron Colbert, Fairlawn, and Lloyd T. Flanner, Florham
Park, N.J., assignors to Allied Chemical Corporation,
New York, N.Y., a corporation of New York
No Drawing. Filed Feb. 17, 1966, Ser. No. 528,078
Int. Cl. C08f 45/04, 45/54
U.S. Cl. 260—23
16 Claims

ABSTRACT OF THE DISCLOSURE

Aerosol metallic coating formulations possessing improved resistance to deleafing comprising: a pigment comprising finely divided solid metal particles; a propellant comprising dichlorodifluoromethane and vinyl chloride; a binder comprising a polymer of an alkyl acrylate or an alkyl methacrylate; an inhibitor comprising a compound selected from the group consisting of nitromethane, phenol, monomethyl ether of hydroquinone, α-methyl styrene, 2,2'-methylene-bis(4-methyl-6-tert-butylphenol), 4,4'-methylene-bis(2,6-di-tert-butylphenol), 2,5 - di - tert-butyl hydroquinone, isostearic acid, a polymer of the reaction product of epichlorohydrin with 2,2-bis(4-hydroxyphenyl)propane, and mixtures thereof.

This invention relates to the provision of novel aerosol metallic coating formulations with improved resistance to deleafing. More particularly, the invention relates to the stabilization against deleafing of metallic coatings applied from aerosol formulations containing, as propellant, a combination of dichlorodifluoromethane and vinyl chloride components.

Metallic coatings are commonly applied, in leafing form, to a variety of substrates by spraying a suspension of finely divided metallic particles containing a leafing agent, in a resinous binder, from a suitable container which is pressurized with a normally gaseous propellant. The term "leafing" is familiar to those skilled in this art and refers to the ability to form uniform, high luster coatings comprising overlapping pigment particles. All leafing formulations are subject to eventual loss of leafing power after periods of extended storage or when subjected to conditions of elevated temperatures. Loss of leafing power results in non-uniform distribution of metallic pigment in which not all of the metallic pigment particles overlap and this results in coated substrates in which the substrates are visible, in places, throughout the transparent resinous binder. This non-uniform distribution of metallic pigment particles is referred to as "deleafing."

Metallic coating formulations containing an acrylic resin as binder and dichlorodifluoromethane as propellant are popular, in part, due to their ability to retain leafing power for relatively long periods of time. Unfortunately, however, the use of dichlorodifluoromethane as propellant by itself entails a number of disadvantages. For one thing, dichlorodifluoromethane does not possess as high a solvency as would be preferred for the popular acrylic resin binders. Low solvency of the binder in the propellant can effect the uniformity of the surface coating applied and also increase the drying times required for such coatings. Another disadvantage in the use of dichlorodifluoromethane propellant alone is its relatively high cost.

The above noted disadvantages have been substantially overcome by replacing some of the dichlorodifluoromethane propellant with a less expensive diluent comprising vinyl chloride. By such means, solvency of the resinous binder in the pressurizing medium is improved and greater economy is achieved without unduly sacrificing the advantageous propellant characteristics of dichlorodifluoromethane.

Unfortunately, however, the beneficial effects achieved by using vinyl chloride in this manner are offset by the fact that, for some reason, the presence of vinyl chloride in such formulations causes premature loss of leafing power upon storage. The nature of the interference of vinyl chloride with leafing power in such formulations is not understood.

It is accordingly an object of this invention to provide aerosol metallic coating leafing formulations possessing improved resistance to deleafing when applied to the usual substrates after periods of storage.

A more specific object of the invention is to provide a means for stabilizing aerosol metallic coating formulations against deleafing, which formulations contain dichlorodifluoromethane as propellant, vinyl chloride as propellant diluent and an acrylic resin as binder.

Another specific object of the invention is to provide aerosol metallic coating formulations containing dichlorodifluoromethane as propellant, vinyl chloride as propellant diluent and an acrylic resin as binder, which formulations have improved resistance to deleafing when applied as coatings to substrates after prolonged periods of storage.

Other objects and advantages of the invention will become apparent from the following description.

It has been found that the above objects may be accomplished by incorporating in such formulations under pressure in an aerosol container a compound selected from the group consisting of nitromethane, phenol, monomethyl ether of hydroquinone, α-methyl styrene, 2,2'-methylene-bis(4-methyl-6-tert-butylphenol), 4,4' - methylene-bis(2,6-di-tert-butylphenol), 2,5-di-tert-butyl hydroquinone, isostearic acid, a polymer of the reaction product of epichlorohydrin with bisphenol, or mixtures thereof. By some mechanism these compounds apparently inhibit the degeneration of leafing power and this has been found to be specific to this class of formulation. The inhibiting effect has also been found to vary, depending upon the particular metallic pigment present and the particular binder present. Discussion of those combinations of specific pigments, binders and inhibitors which were found to result in the most stable formulations towards deleafing will be made hereafter.

By metallic pigment in the subject formulations, we refer to the so-called leafing pigments in powder, flake or paste form which comprise finely divided metallic particles having any of the well known leafing agents incorporated therewith, such as the higher molecular weight fatty acids, e.g., palmitic, stearic and myristic acids. In paste form such leafing pigments normally contain a volatilizable hydrocarbon solvent, such as mineral spirits. Commercial pastes normally contain from about 20–80% by weight of the metallic particles and from about 0.1–4% by weight of leafing agent. Use of metallic pigment in paste form is generally preferred due to the usually increased leafing power possessed by the pigment in this form. Typical commercial pastes suitable for use in the improved formulations of the invention include the common aluminum pastes, e.g., those which are sold under the trademarks: Reynolds #30 Paste and Reynolds #42 Paste.

The metallic particles, in the metallic pigments employed, may be selected from a wide variety of materials and include, for example, aluminum, copper, gold, silver, zinc, magnesium, stainless steel and alloys such as Cu-Zn alloys, Al-Sr alloys and brass. The preferred metallic particles for use in the improved formulations of the invention consist of aluminum.

The amount of metallic pigment which should be employed in the improved formulations of the invention is, on a concentrate basis (i.e., excluding propellant), from about 2–18 weight percent and preferably from about 6–12 weight percent. On the basis of the entire formulation, the content of the metallic pigment is from about 1–8 weight percent and preferably from about 3–5 weight percent.

The combination of dichlorodifluoromethane propellant and vinyl chloride diluent, hereafter and in the claims referred to as propellant, should total from about 35–50 weight percent of the entire formulation (including propellant) and preferably from about 40–50 weight percent of the formulation. The proportion of dichlorodifluoromethane should be between about 10–90 weight percent of the propellant and preferably between about 60–80 weight percent of the same.

The resinous binder for the formulation is a polymer of an alkyl acrylate or an alkyl methacrylate. Such materials may be homopolymers, copolymers or heteropolymers containing at least one repetitive acrylic moiety. Illustrative of homopolymers suitable for use in accordance with the invention are polymethyl acrylate, polyethyl acrylate, polyethyl methacrylate, poly-n-propyl methacrylate, poly-n-butyl methacrylate and poly-isobutyl methacrylate. The polyalkyl methacrylates are preferred.

The acrylic binder material is employed as a low viscosity, free flowing solution. Since the above described acrylic materials, in normal state, range from viscous liquids to hard solids, they must be incorporated in a solvent vehicle for use. Suitable solvents include coal-tar hydrocarbons, such as toluol and xylol; chlorinated hydrocarbons, such as ethylene dichloride and dichlorobenzene; ketones, such as actone and hexone; esters, such as ethyl acetate, butyl lactate and dibutyl phthalate, and ether alcohols, such as Cellosolve acetate and Carbitol acetate. This listing is to be taken as illustrative and not limitative of solvents which may be employed. Viscosity of the resulting solutions, if still too high, can be further reduced by the addition of low molecular weight alkanols, e.g., methanol and ethanol.

All of the above described acrylic materials may be prepared by conventional procedures involving bulk or emulsion polymerization, for example, of the corresponding known acrylic monomers. Many species of these acrylic materials are commercially available. For example, poly-n-butyl methacrylate and polyethyl methacrylate are sold under the trade names Acryloid B–66 and Acryloid B–72, respectively. Acryloids B–66, B–72 and also B–82, a copolymer of acrylic monomers, are all particularly suited for use in the metallic coating formulations of the invention. All are transparent liquids which may assume a milky haze in some solvents but give clear transparent films. These resins are commercially provided in 100% solids form or in solution form, such as in a solution of 40% solids in toluol. A summary of the essential physical characteristics of the above mentioned resins is given in the following table.

TABLE I

| | Specific Gravity | Viscosity Centipoises at 30° C. | Gardner-Holdt | Flash Point Closed Cup (Tag), °F. |
|---|---|---|---|---|
| Acryloid B-66: | | | | |
| 40% solids in toluol | 0.97 | 250–335 | J–N | 39 |
| 100% solids | 1.09 | | | |
| Acryloid B-72: | | | | |
| 40% solids in toluol | 0.96 | 480–640 | R–V | 39 |
| 100% solids | 1.15 | | | |
| Acryloid B-82: | | | | |
| 40% solids in toluol | 0.97 | 480–640 | R–V | 39 |
| 100% solids | 1.16 | | | |

For most effective use of the acrylic resins in the formulations of the invention, the solids content should be adjusted to about 5–26% by weight solids of the concentrate (solids plus solvent) and preferably to about 12–24% by weight solids of the concentrate. Under such conditions, the amount of resin solids present in the formulation as a whole will be from about 3–12 weight percent and preferably from about 6–10 weight percent.

The above mentioned deleafing inhibitors of the invention are all known and are commercially available. Polymers of the reaction product of epichlorohydrin with bisphenol-A are sold under the trade name of "Epon" resins. Epon resins have the general formula:

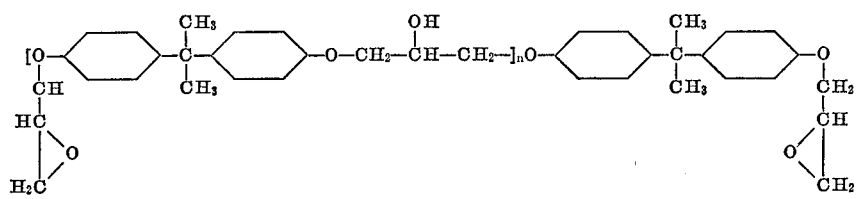

and differ by molecular weight, depending on the value of $n$. Of the Epon resins, Epon-828 has been found to be particularly effective. It is a light colored, transparent liquid at 0° C., is readily pourable at room temperature, is soluble in a number of common organic solvents, such as xylene, acetone, toluene, and methyl ethyl ketone, to name a few and has the following additional essential physical characteristics:

| | |
|---|---|
| Color, 25° C. (Gardner) _____ max__ | 4 |
| Viscosity, centipoises at 25° C. _____ | 100–160 |
| Epoxide equivalent (grams of resin containing one gram-equivalent of epoxide) ____ | 180–195 |
| Weight per gallon, lbs., 20° C. _____ | 9.7 |
| Density, g./ml., 20° C. _____ | 1.168 |
| Refractive index, 25° C. _____ | 1.570–1.575 |
| Flash point, tag open cup, °F. _____ | >175 |
| Hydroxyl content, equiv. OH/100 g. resin __ | 0.06 |
| Avg. molecular weight (approx.) _____ | 380 |
| Equivalent weight (g. resin to esterify one mole of acid) _____ | 85 |

Isostearic acid is a liquid isomer of stearic acid and is sold as Emery 3101–D Isostearic acid. It is a complex mixture of isomers, primarily of the methyl-branched series, which are mutually soluble and essentially inseparable. Pertinent specifications and typical characteristics of isostearic acid include the following:

| | | |
|---|---|---|
| Titer, ° C. | max | 10 |
| Iodine value | max | 10 |
| Free fatty acid, percent (as oleic) | min | 88 |
| Acid value | min | 175 |
| Saponification value | min | 180 |
| Color, photometric index at 440/550 mμ | max | 50/7 |
| Molecular weight (approx.) | | 284 |
| Unsaponifiables, percent | | 5.6 |
| Refractive index, 25° C. | | 1.4603 |
| Viscosity, cps., 25° C. | | 48 |
| Specific gravity at: | | |
| 70° F. | | 0.897 |
| 100° F. | | 0.888 |
| 180° F. | | 0.862 |
| Weight/gallon at: | | |
| 70° F. | | 7.49 |
| 100° F. | | 7.39 |
| 180° F. | | 7.18 |

In view of the fact that isostearic acid is related to stearic acid, and in view of the fact that stearic acid, itself, is a known leafing agent; it was surprising to find that isostearic acid is an effective deleafing inhibitor in the subject formulations, whereas stearic acid is not. The preferred inhibitors for all-around use are nitromethane, α-methyl styrene and isostearic acid.

The activity of a given inhibitor, as above described, appears to be more or less specific to a given resin and metallic pigment system. The optimum combinations and concentrations of the inhibitors described herein with a particular resin and pigment system may be ascertained by routine testing employing procedures similar to those which are described in the examples. As will be apparent from the forthcoming examples, 2,5-di-tert-butyl hydroquinone, 2,2'-methylene-bis(4-methyl-6-tert-butylphenol), 4,4'-methylene-bis(2,6-di-tert-butylphenol) and Epon-828 have proved to be most effective as deleafing inhibitors in systems comprising aluminum pigment and Acryloid B-72 binder. Monomethyl ether of hydroquinone, phenol, 2,5 - di - tert - butyl hydroquinone and nitromethane have proved to be particularly effective in systems, comprising aluminum pigment and Acryloid B-66 binder. 2,2'-methylene-bis(4-methyl-6-tert-butylphenol), Epon-828 and isostearic acid have been found to be particularly effective in a system comprising aluminum pigment and Acryloid B-82 binder. Monomethyl ether of hydroquinone, phenol, nitromethane and α-methyl styrene have been found to be particularly effective in formulations comprising aluminum pigment and Acryloid B-82 LV (low viscosity) binder. 2,2' - methylene-bis(4-methyl-6-tert-butylphenol), nitromethane and α-methyl styrene have been found to be particularly effective in formulations comprising copper powder and Acryloid B-82 LV binder.

The amount of inhibitor which should be employed varies from about .05 to 2 weight percent of the formulation. Generally, the higher concentration of inhibitor, the longer will be the period during which the formulation will be stabilized against deleafing. For commercial purposes, the maximum feasible amount of stabilization is obtained by using the inhibitor in about 2% by weight of the formulation. Normally, the preferred concentration of inhibitor lies between about .1–1.0 weight percent of the formulation. Expressed as weight percent of the concentrate (formulation without propellant), the broad desirable range is between about .1–4% with the preferred range being between about .2–1.2%. In a given case, the optimum concentration of inhibitor, while falling within the above indicated ranges, will vary with the nature of the acrylic binder, the metallic pigment, the relative proportion of vinyl chloride to dichlorodifluoromethane and other factors, and may be determined by routine testing as noted above.

A variety of other additives may be incorporated in the stabilized formulations of the invention as may be desired. Such additives may include, for example, such materials as plasticizers and hardening and etching agents, to name a few.

The method of preparing the formulations is not critical. The selected components are merely mixed in the desired proportions in any order in a suitable container. Typically, an aerosol dispensing container is charged with the chosen binder system; the inhibitor and the metallic powder pigment are charged to the container; the system is cooled below the boiling point of the propellant mixture (say about 0° F.) and the container is charged with the propellant mixture is liquid form and is then sealed.

The following examples illustrate a number of specific stabilized formulations which have been found to be particularly effective and thus constitute the preferred embodiments of the invention.

The following formula was used for the preparation of aluminum coating concentrates (formulation minus propellant components) in all but those samples containing Epon–828 and isostearic acid as inhibitors.

| | G. |
|---|---|
| Resin | 12.50 |
| Toluol | 35.00 |
| Reynolds #42 aluminum paste | 6.50 |

The following formula was used for the preparation of aluminum containing concentrates with either Epon-828 or isostearic acid as inhibitor:

| | G. |
|---|---|
| Resin | 69.8 |
| Toluol | 240.8 |
| Extra fine Al paste [1] | 19.4 |

[1] The Al paste is 74.0% non-volatile and exhibits a fineness residue on 325 mesh screen of 0.1%, and a leafing value of 60.0%.

The following formula was used for the preparation of copper (color) coating concentrates:

| | G. |
|---|---|
| Resin | 12.50 |
| Toluol | 33.80 |
| U.S. bronze #8,000, gold powder | 7.70 |

Various acrylic resins, as defined supra, were substituted for the resin components in the above formulae.

With the exception of one control for each concentrate system, 50 p.p.m. of the following inhibitors were added to concentrate samples: monomethyl ether of hydroquinone, phenol, 2,5-di-tert-butyl hydroquinone, 2,2'-methylene-bis(4-methyl-6 - tert-butylphenol) and 4,4'-methylene-bis(2,6-di-tert-butylphenol). 0.2% by weight of the following inhibitors were incorporated into other concentrate samples: nitromethane and α-methyl styrene. 1.03% by weight of the following inhibitors were incorporated into other concentrate samples: Epon-828 and isostearic acid.

Aerosol formulation samples were prepared with each of the concentrate samples, described above, in a ratio consisting of 55 weight percent concentrate to 45 weight percent of the propellant mixture. The proportion of dichlorodifluoromethane used in the propellant mixture was 65 weight percent.

The formulation samples were prepared in tin-plated steel aerosol containers, with soldered side seams and, with the exception of those samples containing Epon-828 and isostearic acid as inhibitor, were stored for six moths at 110° F. The samples containing Epon-828 and isostearic acid were stored at 125° F. for 5 weeks. Storage at 110° F. for six months simulates a storage period of approximately three years at room temperature, the normal storage temperature. After the storage period, coatings were applied to panels of wood and metal from the containers and by visual inspection, the coatings were assigned a rating of good, fair or bad. The containers were assigned a rating of good if there was no detectable deleafing; a rating of fair if there was only very slight deleafing, detectable only with closest investigation and a rating of bad if there was readily noticeable deleafing.

droquinone, α-methyl styrene, 2,2'-methylene-bis(4-methyl-6-tert-butylphenol), 4,4' - methylene-bis(2,6-di-tert-butylphenol), 2,5-di-tert-butyl hydroquinone, isostearic acid, a polymer of the reaction product of

TABLE II

| Example: | Metallic Pigment | Resin | Inhibitor | Result 6 Months Test |
|---|---|---|---|---|
| 1 | Reynolds Al paste #42 | B-66 | None | Bad. |
| 2 | do | B-66 | MMEH | Fair. |
| 3 | do | B-66 | PH | Do. |
| 4 | do | B-66 | 2,5 DBH | Do. |
| 5 | do | B-66 | NM | Do. |
| 6 | do | B-72 | None | Bad. |
| 7 | do | B-72 | 2,5 DBH | Good. |
| 8 | do | B-72 | 2246 | Do. |
| 9 | do | B-72 | 4426 | Do. |
| 10 | do | B-82 | None | Bad. |
| 11 | do | B-82 | 2246 | Good. |
| 12 | do | B-82(LV) | None | Bad. |
| 13 | do | B-82(LV) | MMEH | Good. |
| | | | PH | Do. |
| | | | NM | Do. |
| | | | AMS | Do. |
| 14 | Reynolds Gold paste #8,000 | B-82(LV) | None | Bad. |
| | | | 2246 | Good. |
| | | | AMS | Do. |
| 15 | Extra Fine Al paste | B-72 | None | Bad. |
| 16 | do | B-72 | 828 | Good. |
| 17 | do | B-72 | ISA | Do. |
| 18 | do | B-82 | None | Bad. |
| 19 | do | B-82 | ISA | Good. |

Legend:
MMEH, monomethyl ether of hydroquinone.
PH, phenol.
2,5 DBH, 2,5-di-tert-butyl hydroquinone.
NM, nitromethane.
2246, 2,2'methylene-bis(4-methyl-6-tert-butylphenol).
4426, 4,4'-methylene-bis(2,6-di-tert-butylphenol).
AMS, α-methyl stryene.
828, Epon-828.
ISA, isostearic acid.

The above description has been made with reference to a number of illustrative embodiments and as it will be apparent that variations and modifications may be made without departing from the spirit of the invention, the invention is to be limited only by the scope of the appended claims.

We claim:
1. An aerosol metallic coating formulation, in an aerosol container, possessing improved resistance to deleafing comprising:
   (a) a pigment comprising finely divided solid metal particles,
   (b) a propellant comprising dichlorodifluoromethane and vinyl chloride,
   (c) a binder comprising a polymer of an alkyl acrylate or an alkyl methacrylate and
   (d) an inhibitor comprising a compound selected from the group consisting of nitromethane, phenol, monoethyl ether of hydroquinone, α-methyl styrene, 2,2'-methylene-bis(4-methyl-6 - tert-butylphenol), 4,4'-methylene-bis(2,6-di-tert - butylphenol), 2,5-di-tert-butyl hydroquinone, isostearic acid, a polymer of the reaction product of epichlorohydrin with 2,2-bis(4-hydroxyphenyl)propane, and mixtures thereof.

2. An aerosol metallic coating formulation according to claim 1 comprising:
   (a) about 1 to 8 weight percent of a pigment comprising finely divided solid metal particles,
   (b) about 35 to 50 weight percent of a mixture comprising dichlorodifluoromethane and vinyl chloride, in which mixture the dichlorodifluoromethane component occupies about 10–90% by weight,
   (c) about 3 to 12 weight percent solids of a binder comprising a polymer of an alkyl acrylate or an alkyl methacrylate and
   (d) about .05 to 2 weight percent of an inhibitor comprising a member selected from the group consisting of nitromethane, phenol, monomethyl ether of hydroquinone, α-methyl styrene, 2,2'-methylene-bis(4-methyl-6-tert-butylphenol), 4,4' - methylene-bis(2,6-di-tert-butylphenol), 2,5-di-tert-butyl hydroquinone, isostearic acid, a polymer of the reaction product of epichlorohydrin with 2,2-bis(4-hydroxyphenyl)propane, and mixtures thereof.

3. An aerosol metallic coating formulation according to claim 1 comprising:
   (a) about 3 to 5 weight percent of a pigment comprising finely divided solid metal particles,
   (b) about 40 to 50 weight percent of a mixture comprising dichlorodifluoromethane and vinyl chloride, in which mixture the dichlorodifluoromethane component occupies about 60–80% by weight,
   (c) about 6 to 10 weight percent solids of a binder comprising a polymer of an alkyl acrylate or an alkyl methacrylate and
   (d) about .1 to 1 weight percent of an inhibitor comprising a member selected from the group consisting of nitromethane, phenol, monomethyl ether of hydroquinone, α-methyl styrene, 2,2'-methylene-bis (4-methyl-6-tert-butylphenol), 4,4'-methylene-bis(2, 6-di-tert-butylphenol), 2,5-di - tert-butyl hydroquinone, isostearic acid, a polymer of the reaction product of epichlorohydrin with 2,2-bis(4-hydroxyphenyl)propane, and mixtures thereof.

4. An aerosol metallic formulation according to claim 1 in which the finely divided metallic particles comprise particles of aluminum.

5. An aerosol metallic coating formulation according to claim 1 in which the binder comprises a homopolymer of an alkyl methacrylate.

6. An aerosol metallic coating formulation according to claim 1 in which the inhibitor is a member selected from the group consisting of nitromethane, α-methyl styrene and isostearic acid.

7. An aerosol metallic coating formulation according to claim 1 in which the finely divided metal particles are aluminum and the inhibitor is a member selected from the group consisting of 2,5-di-tert-butyl hydroquinone, 2,2'-methylene-bis(4-methyl - 6 - tert - butylphenol), 4,4'-methylene-bis(2,6-di-tert-butylphenol), a polymer of the reaction product of epichlorohydrin and 2,2-bis(4-hydroxyphenyl)propane and isostearic acid.

8. An aerosol metallic coating formulation according to claim 1 in which the finely divided metal particles are aluminum; in which the binder material comprises polyethyl methacrylate and in which the inhibitor is a member selected from the group consisting of 2,5-di-tert-butyl hydroquinone, 2,2'-methylene-bis(4-methyl-6-tert-butylphenol), 4,4'-methylene-bis(2,6-di-tert-butylphenol), a polymer of the reaction product of epichlorohydrin with 2,2-bis-(4-hydroxyphenyl)propane and isostearic acid.

9. An aerosol metallic coating formulation according to claim 1 in which the finely divided metal particles are aluminum, the binder material comprises poly-n-butyl methacrylate and the inhibitor is a member selected from the group consisting of monomethyl ether of hydroquinone, phenol, 2,5-di-tert-butyl hydroquinone and nitromethane.

10. A method for improving resistance to deleafing of an aerosol metallic coating formulation under pressure in an aerosol container, which formulation comprises:
   (a) a pigment comprising finely divided solid metal particles,
   (b) a propellant comprising dichlorodifluoromethane and vinyl chloride, and
   (c) a binder comprising a polymer of an alkyl acrylate or an alkyl methacrylate; which method comprises incorporating into said formulation a deleafing-inhibiting amount of a compound selected from the group consisting of nitromethane, phenol, monomethyl ether of hydroquinone, α-methyl styrene, 2,2'-methylene - bis (4-methyl-6-tert-butylphenol), 4,4'-methylene-bis (2,6-di-tert-butylphenol), 2,5-di-tert-butyl hydroquinone, isostearic acid, a polymer of the reaction product of epichlorohydrin with 2,2-bis(4-hydroxyphenyl)propane, and mixtures thereof.

11. A method according to claim 10 in which the formulation comprises:
   (a) about 1 to 8 weight percent of the pigment,
   (b) about 35 to 50 weight percent of the propellant, which propellant contains about 10–19 weight percent of dichlorodifluoromethane and
   (c) about 3 to 12 weight percent solids of the binder, in which method there is incorporated in said formulation from about 0.5–2 weight percent of the inhibitor.

12. A method according to claim 10 in which the formulation comprises:
   (a) about 3 to 5 weight percent of the pigment,
   (b) about 40 to 50 weight percent of the propellant, which propellant contains about 60 to 80% by weight dichlorodifluoromethane and
   (c) about 6 to 10 weight percent solids of the binder, in which method there is incorporated in said formulation from about .1 to 1 weight percent of the inhibitor.

13. A method according to claim 10 in which the metallic pigment is aluminum.

14. A method according to claim 10 in which the metallic pigment is aluminum and the inhibitor which is incorporated in the formulation is a member selected from the group consisting of nitromethane, α-methyl styrene and isostearic acid.

15. A method according to claim 10 in which the metallic pigment is aluminum, the binder comprises polyethyl methacrylate and the inhibitor which is incorporated in the formulation is a member selected from the group consisting of 2,5-di-tert-butyl hydroquinone, 2,2'-methylene-bis(4-methyl-6-tert-butylphenol), 4,4'-methylene - bis-(2,6-di-tert-butylphenol), a polymer of the reaction product of epichlorohydrin and 2,2-bis(4-hydroxyphenyl)propane and isostearic acid.

16. A method according to claim 10 in which the metallic pigment is aluminum, the binder comprises poly-n-butyl methacrylate, and the inhibitor which is incorporated in the formulation is a compound selected from the group consisting of monomethyl ether of hydroquinone, phenol, 2,5-di-tert-butyl hydroquinone and nitromethane.

References Cited

UNITED STATES PATENTS

| | | | |
|---|---|---|---|
| 2,736,665 | 2/1956 | Rogers | 106—190 |
| 2,990,386 | 6/1961 | Roney | 260—23 |
| 3,085,890 | 4/1963 | Rolles | 106—241 |
| 3,265,650 | 8/1966 | Kerr | 260—23 |
| 2,178,179 | 10/1939 | McMahan | 106—290 |
| 2,731,436 | 1/1956 | Stetz et al. | 260—33.6 |
| 3,383,344 | 5/1968 | Gill | 260—22 |
| 3,400,095 | 9/1968 | Kremer et al. | 260—32.8 |

DONALD E. CZAJA, Primary Examiner

R. A. WHITE, Assistant Examiner

U.S. Cl. X.R

106—290; 260—31.4, 33.6, 33.8, 41, 837

UNITED STATES PATENT OFFICE
CERTIFICATE OF CORRECTION

Patent No. 3,488,308      Dated January 6, 1970

Inventor(s) Aaron Colbert and Lloyd T. Flanner

It is certified that error appears in the above-identified patent and that said Letters Patent are hereby corrected as shown below:

Column 3, line 60, "actone" should read -- acetone --.

Column 4, lines 39-49, that portion of the formula reading $$\begin{matrix} \text{"[O-"} \\ | \\ \text{CH} \\ | \end{matrix} \qquad \text{should read} \quad \begin{matrix} \text{[O-} \\ | \\ \text{CH}_2 \\ | \end{matrix} \text{--}$$

Column 6, line 13, "is (first occurrence) should read -- in --;

line 67, "moths" should read -- months --.

Column 7, line 56, "ethyl" should read -- methyl --.

Column 9, line 41, "19" should read -- 90 --;

line 45, "0.5" should read -- .05 --.

Column 10, line 3, -- of -- should be inserted after "weight".

SIGNED AND SEALED
JUN 23 1970

(SEAL)
Attest:

Edward M. Fletcher, Jr.
Attesting Officer

WILLIAM E. SCHUYLER, JR.
Commissioner of Patents